United States Patent
Kloft et al.

(10) Patent No.: US 11,168,706 B2
(45) Date of Patent: Nov. 9, 2021

(54) EQUALIZATION DEVICE, IN PARTICULAR IN THE FORM OF A TANK

(71) Applicant: HYDAC TECHNOLOGY GMBH, Sulzbach/Saar (DE)

(72) Inventors: Peter Kloft, Ransbach-Baumbach (DE); Herbert Baltes, Losheim (DE); Joerg Meyer, Hohberg (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 162 days.

(21) Appl. No.: 16/487,490

(22) PCT Filed: Jun. 29, 2018

(86) PCT No.: PCT/EP2018/067631
§ 371 (c)(1),
(2) Date: Aug. 21, 2019

(87) PCT Pub. No.: WO2019/007845
PCT Pub. Date: Jan. 10, 2019

(65) Prior Publication Data
US 2020/0056629 A1    Feb. 20, 2020

(30) Foreign Application Priority Data
Jul. 4, 2017  (DE) .................. 10 2017 006 305.2

(51) Int. Cl.
*F16L 55/04*   (2006.01)
*F15B 1/16*    (2006.01)
(Continued)

(52) U.S. Cl.
CPC .............. *F15B 1/165* (2013.01); *F15B 1/086* (2013.01); *F15B 2201/20* (2013.01);
(Continued)

(58) Field of Classification Search
CPC ...... F15B 1/165; F15B 1/086; F15B 2201/20; F15B 2201/3151; F15B 2201/3152; F17C 1/00; F24D 3/1016
(Continued)

(56) References Cited

U.S. PATENT DOCUMENTS 2,405,614 A * 8/1946 Shriro ...................... E04B 1/62
                                                220/721
3,534,884 A * 10/1970 Suter ...................... B60K 15/03
                                                220/723
(Continued)

FOREIGN PATENT DOCUMENTS

DE   10 2005 035 749    2/2007
DE   10 2006 026 413    12/2007
(Continued)

OTHER PUBLICATIONS

International Search Report (ISR) dated Sep. 17, 2018 in International (PCT) Application No. PCT/EP2018/067631.

*Primary Examiner* — James F Hook
(74) *Attorney, Agent, or Firm* — Wenderoth, Lind & Ponack, L.L.P.

(57) ABSTRACT

An equalization device is, in particular, in the form of a tank. The housing (2) of the tank has at least one inlet (8) and one outlet (10) for receiving and discharging fluid, respectively, at least in one of the housing walls (4) of the housing, which housing can be filled with the fluid. At least one equalization body (14) is arranged within the housing (2). The equalization body is at least partly provided with an elastically compliant separating wall (20). The interior of the equalization body is delimited, and is at least partly in pressure-equalizing connection (32) with the surroundings at a passage (12, 32) through one of the housing walls (4).

8 Claims, 1 Drawing Sheet

(51) Int. Cl.
  *F15B 1/08* (2006.01)
  *F17C 1/00* (2006.01)
  *F24D 3/10* (2006.01)

(52) U.S. Cl.
  CPC ............... *F15B 2201/3151* (2013.01); *F15B 2201/3152* (2013.01); *F17C 1/00* (2013.01); *F24D 3/1016* (2013.01)

(58) Field of Classification Search
  USPC .......................................................... 138/30
  See application file for complete search history.

(56) References Cited

U.S. PATENT DOCUMENTS

| | | | | |
|---|---|---|---|---|
| 3,807,901 | A * | 4/1974 | Wilson | E03F 5/22 417/40 |
| 4,032,265 | A * | 6/1977 | Miller | F04B 11/0016 417/540 |
| 4,367,786 | A * | 1/1983 | Hafner | F15B 1/086 165/10 |
| 4,897,906 | A * | 2/1990 | Bartholomew | F16L 55/05 138/26 |
| 5,655,569 | A * | 8/1997 | Tackett | B60T 8/4068 138/30 |
| 6,041,742 | A * | 3/2000 | Drake | F24D 3/02 122/14.1 |
| 8,592,063 | B1 * | 11/2013 | Musetti | H01M 50/308 429/53 |
| 10,934,384 | B1 * | 3/2021 | Robinson | C08G 18/664 |
| 2003/0111124 | A1 * | 6/2003 | Gray, Jr. | F16L 55/053 138/30 |
| 2009/0095366 | A1 | 4/2009 | Gray, Jr. | |
| 2009/0205731 | A1 | 8/2009 | Weber | |
| 2018/0038391 | A1 * | 2/2018 | Kloft | F15B 1/086 |

FOREIGN PATENT DOCUMENTS

| | | |
|---|---|---|
| DE | 10 2007 016 131 | 10/2008 |
| DE | 10 2012 000 221 | 7/2013 |
| DE | 10 2015 003 673 | 9/2016 |
| GB | 2 160 592 | 12/1985 |
| GB | 2 176 589 | 12/1986 |

* cited by examiner

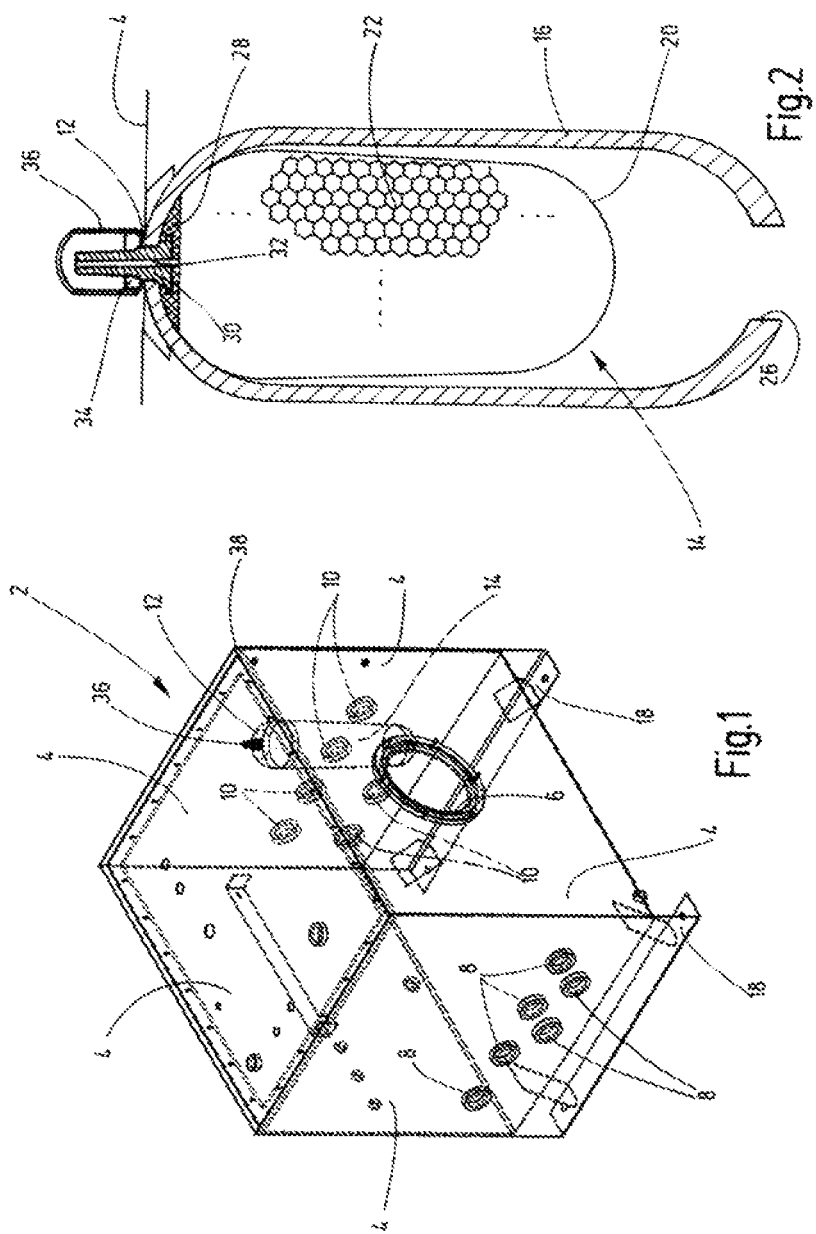

EQUALIZATION DEVICE, IN PARTICULAR IN THE FORM OF A TANK

FIELD OF THE INVENTION

The invention concerns an equalization device, in particular in form of a tank. The housing of the equalization device comprises at least in one of its housing walls at least one inlet and one outlet for the filling and discharge, respectively, of fluid, and may be filled with the fluid.

BACKGROUND OF THE INVENTION

In plants of many different kinds in which liquids are circulated or conveyed as part of the system, containers such as tanks are provided as components that may be filled via inlets and discharged via outlets. The document DE 10 2012 000 221 A1, for example, describes tank-type containers with facilities for receiving and discharging liquid, which constitute components of a facility for degassing liquids. Liquid containers, such as tanks, with inlets and outlets may also be used as equalization elements to compensate for volume variations that occur during the operation of plants.

SUMMARY OF THE INVENTION

An object of the invention to provide an equalization device with a liquid container, such as a tank, that is characterized by particularly advantageous operating characteristics when used for the compensation of volume variations.

According to the invention, this object is basically met by an equalization device having at least one equalization body is disposed inside the housing. The equalization body is provided at least partially with an elastically flexible separating wall for delimiting its internal space, which is at least partially in pressure-equalizing connection with the environment by a passage through one of the housing walls.

Due to the fact that an equalization body is disposed inside the housing of the invention and an elastically flexible separating wall encloses an internal space that is equal in pressure to the environment, the internal space is available as a flexible equalization space. The volume of the internal space changes when, during operation of the tank, pressure is applied to the separating wall. This changing volume provides the advantageous possibility to operate the tank in a closed hydraulic system since the equalization function, which is available through volume changes of the internal space of the elastically flexible separating wall, remains intact even if completely filled. Since the tank can be operated in a closed hydraulic circuit, there is no danger of introducing any contaminants from outside the tank into the fluid, nor is there any danger of contaminating the environment by fluid discharged from the tank.

The equalization device according to the invention may advantageously be realized in that the housing forms a closed container for the fluid retained in the housing, with the exception of passages such as for the respective inlet and outlet and the pressure-equalizing connection. The container holds an additional fluid volume, which may for example be caused by an oscillating volume of the fluid and/or a volume increase due to a temperature increase of the fluid stored inside the housing. The additional volume at most corresponds to the displacement volume that is formed by the deformation of the separating wall of the respective equalization body in the direction of its internal space.

In particularly advantageous exemplary embodiments the elastically flexible separating wall of the equalization body is provided in form of a flexible accumulator bladder made from elastomeric material. The internal space of the bladder is at least partially filled with a foam material.

The accumulator bladder may advantageously be filled with a foam material that is open-celled, highly porous and elastically flexible.

The arrangement may be implemented with particular advantage in that the accumulator bladder is disposed inside a protective housing to protect the accumulator bladder from pressure pulsations and pressure shocks. The protective housing is provided at least partially with at least one passage for fluid to pass through.

In advantageous exemplary embodiments the flexible accumulator bladder is mounted rigidly, if necessary together with its protective housing. The protective housing upper end faces an upper housing wall of the housing, under formation of the passage for a media exchange, in particular an air exchange between the inner volume of the accumulator bladder and the environment, via a mounting bracket to the upper housing wall.

The arrangement is advantageously such that the flexible bladder is spindle-shaped in its uncompressed state and protrudes vertically into the housing.

In exemplary embodiments in which the housing with its housing walls forms a rectangular-shaped storage tank, the flexible accumulator bladder may advantageously be disposed in a corner region of the housing that is at least partially untouched by the flow through the housing. The avoidance of a strong flow reduces not only the mechanical load on the equalization body through flow forces, but also the danger of foam formation when the device is in operation.

It may be particularly advantageous to use a polymer polyol for the foam material which, when cured, forms flexible polyurethane (PU) foam. The foam is crosslinked by a crosslinking agent such as di glycol amine.

Particularly advantageous is the use of flexible polyurethane foam for an accumulator bladder that performs as an equalization element. The flexible polyurethane foam has, in its finished state, a thermal capacity of 20° C.>1 J/gK, preferably a value between 1.4 J/gK and 1.9 J/gK, at a flow resistance between 1400 and 3800 Ns/m$^3$ as measure for the porosity of the foam material.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 1 is a schematically simplified, perspective view of an equalization device according to an exemplary embodiment of the invention in form of a tank; and FIG. 2 is a side view in section through the equalization body of the exemplary embodiment of FIG. 1.

DETAILED DESCRIPTION OF THE INVENTION

FIG. 1 shows a schematically much simplified representation of the exemplary embodiment of the invention in form of a tank. The housing 2 of the tank has the shape of a cube, with planar housing walls 4. The housing 2 provides for the fluid a container which, with the exception of passages, is completely closed. One of the passages shown in the representation of FIG. 1 is a normally closed service opening 6, which is located in a central position in a vertical housing wall 4. When open, opening 6 permits access to the inside of the housing. In the vertical housing wall 4, which adjoins the wall with the service opening 6 as shown in FIG. 1, six further passages 8 are provided, each of which is a fluid inlet connection point. Provided in the opposite vertical housing wall 4 are also six connection points 10, each of which constitutes a fluid outlet. A further and last passage is provided in the upper, horizontal housing wall 4, which is a connection point 12 to which an equalization body 14 is attached, as depicted separately in FIG. 2 together with its protective housing 16. The remaining construction elements disposed on the housing walls 4, as shown in FIG. 1, are attachment or mounting components, such as the base rails 18, which do not provide a passage in the housing walls 4 into the inside of the container.

The equalization body 14 is provided as elastically flexible separating wall with a flexible accumulator bladder 20 that is provided with a filling 22 of foam material. The filling 22 provided in the equalization device according to the invention is an open-cell foam material that is highly porous and elastically flexible. The filling 22 used in the present example is flexible polyurethane foam. Nevertheless, other highly porous foam materials may also be used. As shown in FIG. 2, the accumulator bladder 20 is retained inside the protective housing 16 to protect it from pressure pulsations and pressure shocks. The protective housing 16 comes in the present example in form of a storage cylinder with a circular cross-section. The protective housing 16 may be made from metal or laminates. At the lower end, as depicted in FIG. 2, the protective housing 16 is provided with an opening 26 through which the accumulator bladder 20 may be inserted into protective housing 16 in a compressed state. In the uncompressed state, as it is shown in FIG. 2, the flexible accumulator bladder 20 has the depicted spindle-shaped, rotationally symmetrical form shown in the drawing. At the upper end, the accumulator bladder 20 is provided with a reinforced section 28 into which a connector 30 is fitted. Connector 30 protrudes through the protective housing 16 to the outside. Provided on the inside of connector 30, which is shaped as a rotationally symmetrical spigot, is a coaxial channel 32, which provides a passage from the inside of the accumulator bladder 20, facilitating an air exchange between the inside of the accumulator bladder 20 and the environment. The connector 30 forms at the same time the attachment of the accumulator bladder 20 together with protective housing 16 at the connection point 12 of the upper housing wall 4. To this end the connector 30 is provided with an external thread for a clamp nut 34, which forms a screw connection with housing wall 4. The end of connector 30, which protrudes from the housing wall 4, is protected by a protective cover 36, which is permeable to air and is pushed over the nut 34.

To obtain the flexible polyurethane foam, the insertion of the foam filling 22 may be implemented through a method in which the foam components are inserted as a free-flowing blend of polyols, catalysts and a crosslinking agent, such as di glycol amine, via channel 32 in connector 30. After curing of the cross-linked compound, the finished, flexible polyurethane foam, which is advantageously suitable for the equalization body of the equalization device according to the invention, has a thermal capacity of 20° C.>1 J/gK, preferably a value of 1.4 J/gK to 1.9 J/gK. The flow resistance, which is a measure for the porosity of the foam material, is between 1400 and 3800 Ns/m$^3$. As shown in FIG. 1, the equalization body 14, which extends in vertical direction inside housing 2, is attached in a corner section at the upper housing wall 4 of housing 2, which is in the vicinity of corner 38, formed by the housing wall 4 with the connection points 10 and the housing wall 4 with the service opening 6. In this arrangement, the equalization body 14 is located in a part of the housing that is offset from the top as well as laterally with respect to the main flow section of the fluid flowing from the connection points 8 to the connection points 10. Due to the comparably even flow, the equalization body 14 is then subjected to a reduced load of flow forces that may harm it.

While one embodiment has been chosen to illustrate the invention, it will be understood by those skilled in the art that various changes and modifications can be made therein without departing from the scope of the invention as defined in the claims.

The invention claimed is:

1. A equalization device, comprising:
   a tank housing having housing walls with an inlet for filling fluid in the tank housing, with an outlet for discharging the fluid from the tank housing and with a pressure-equalizing connection in fluid communication with an environment outside the tank housing and attached to an upper housing wall of the tank housing, the tank housing forming a closed container for the fluid in the housing except for passages of the inlet, the outlet and the pressure-equalizing connection;
   an equalization body disposed inside the tank housing and rigidly mounted to the upper housing wall, the equalization body having an elastically flexible separating wall delimiting an internal space of the equalization body, the internal space being connected continuously in fluid communication with the pressure-equalization connection and thereby to the environment, the separating wall being a flexible accumulator bladder of elastomeric material, the internal space being at least partially filled with foam material; and
   a protective housing fixedly rigidly mounted in the tank housing at an upper end of the protective housing to the upper housing wall under the pressure-equalizing connection by a mounting bracket, the equalization body being disposed in the protective housing, the protective housing protecting the equalization body from pressure pulsation and pressure shocks and having a passage passing therethrough;
   whereby an oscillating volume of the fluid in the tank housing or a volume increase due to a temperature increase of the fluid in the tank housing deforms the separating wall of the equalization body corresponding to displacement volumes in the fluid in the tank housing.

2. An equalization device according to claim 1 wherein the foam material is open-celled, porous and elastically flexible.

3. An equalization device according to claim 1 wherein the flexible accumulator bladder is spindle-shaped in an uncompressed state thereof and extends vertically in the tank housing.

4. An equalization device according to claim 1 wherein the housing walls of the tank housing form a rectangular-shaped storage tank; and the flexible accumulator bladder is disposed in a corner region of the tank housing at least partial untouched by fluid flow from the inlet to the outlet in the tank housing.

5. An equalization device according to claim 1 wherein the foam material is a polymer polyol cured to form flexible polyurethane foam crosslinked by a crosslinking agent.

6. An equalization device according to claim 5 wherein the crosslinking agent is diglycol amine.

7. An equalization device according to claim 5 wherein the flexible polyurethane foam after being cured and crosslinked has a thermal capacity of 20° C. greater than 1 J/gk at a flow resistance between 1400 and 3800 Ns/m$^2$ as a porosity measure of the foam material.

8. An equalization device according to claim 7 wherein a value of the thermal capacity is between 1.5 and 1.9 J/gk.

* * * * *